Patented Nov. 21, 1933

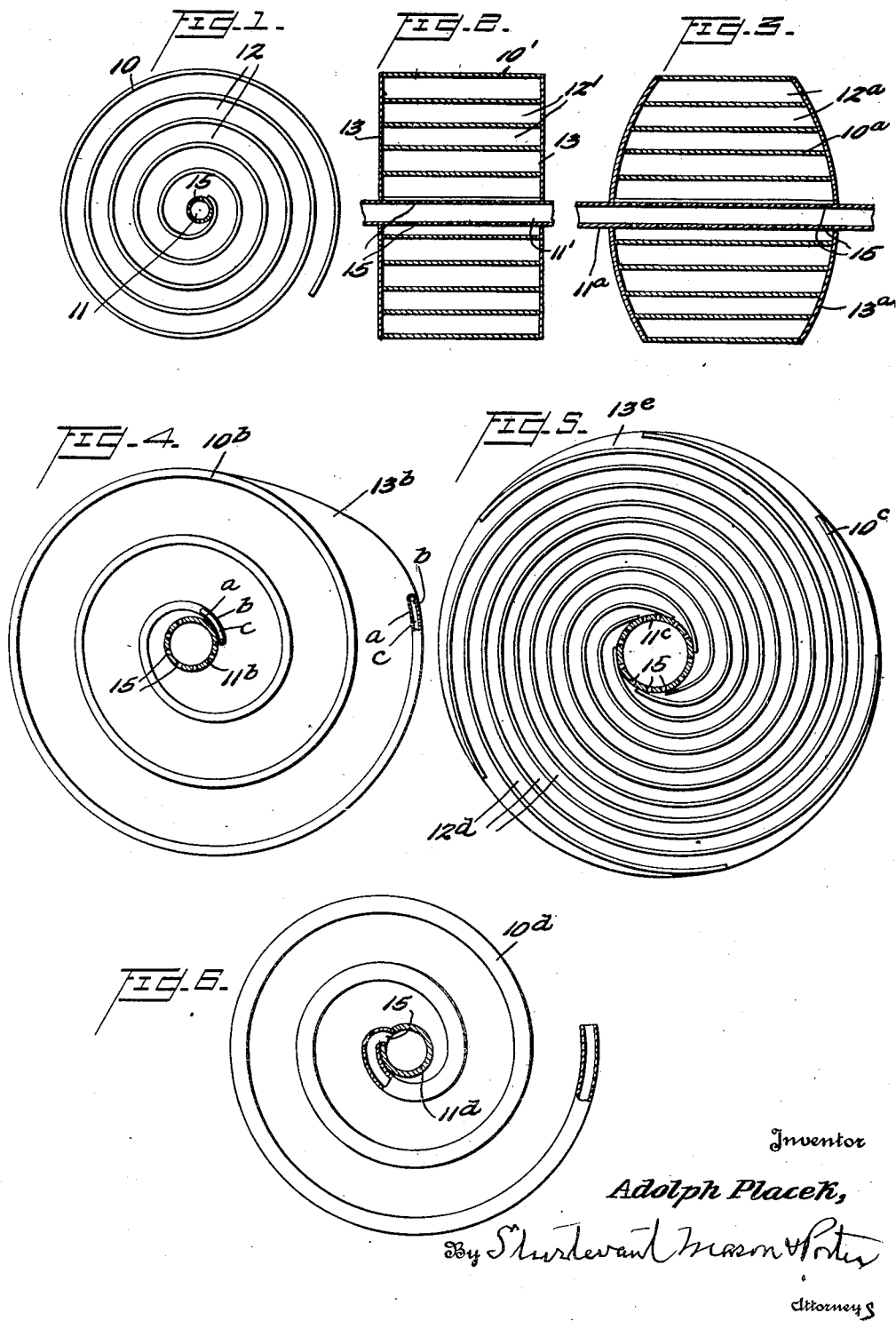

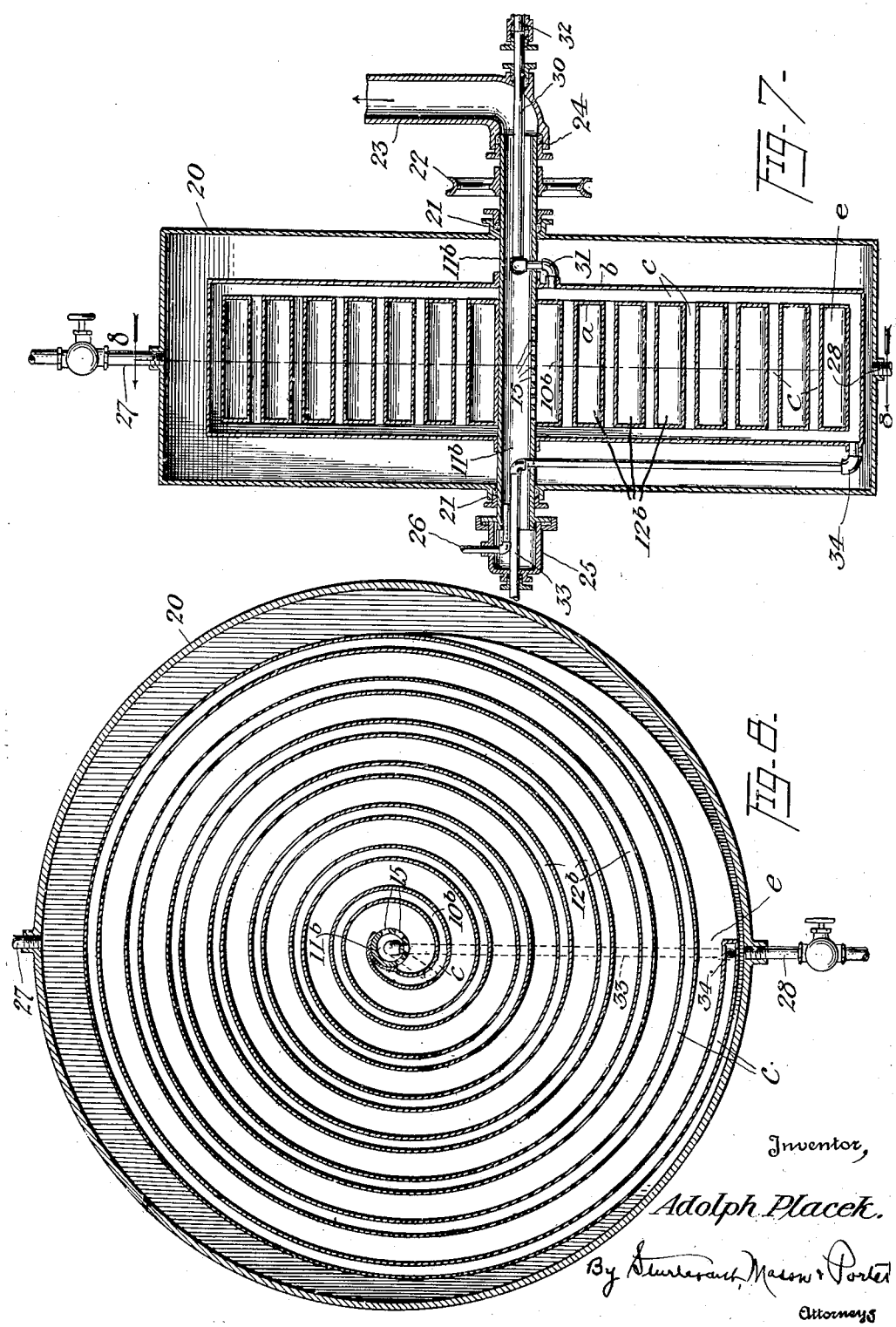

1,936,524

UNITED STATES PATENT OFFICE 1,936,524

METHOD AND MEANS FOR CONVEYING AND DISTRIBUTING MATERIALS FOR PROCESS TREATMENT

Adolph Placek, New Orleans, La.

Application February 7, 1931. Serial No. 514,292

8 Claims. (Cl. 261—86)

The present invention is a method and means for conveying and distributing material; and has as one of its objects such a method and means by which the physical-chemical operations, like in the distillation, evaporation, drying, absorption and other analogous process treatments, or many times reactions, like in fermentations, chlorination, sulphonation, etc., can be performed in continuous process and by means of a simpler, more efficient and space-saving apparatus than heretofore.

Another of the principal objects of the invention is, broadly, to so convey and distribute portions of liquid or powder or loose solid materials, over an inclosed surface or surfaces in continuous process as to establish a very efficient condition of exposure of the material to the direct contact of the treating mediums, whether steam, vapors, cold or hot gases, introduced in the chamber or casing containing the conveying surface or surfaces, or to the indirect contact through the walls of the surface or surfaces, whereby the properties of the material at the initial stage of the treatment are gradually changed to those of the final stages of the treatment.

Another object of the invention is to effect a very efficient separation of small solid particles, like dust, or liquids from dry vapors or gases.

In the drawings, which illustrate diagrammatically and by way of example several conveying and distributing means which may be employed in practicing the invention:

Fig. 1 is a side elevation of a conveying and distributing means in accordance with the invention in its simplest form and consisting of a spiral surface;

Fig. 2 is a vertical section through a conveying and distributing means similar to that shown in Fig. 1, but being provided with side or end walls;

Fig. 3 is a view similar to Fig. 2, but of different cross-sectional shape or design;

Fig. 4 is a side elevation of another modified construction, where the walls of the spiral are doubled or provided with passages therein;

Fig. 5 is a view similar to Fig. 4 of a further modified construction providing several independent spiral passages about the same axis;

Fig. 6 is a view similar to Fig. 1, wherein the spiral passage is provided by a spiral tube;

Figure 7 is a vertical sectional view taken substantially through an apparatus which may employ therein the various conveying and distributing means shown in the foregoing figures of the drawings, but which is preferably illustrated as employing the form of the invention shown in Figure 4; and Figure 8 is a vertical sectional view taken substantially on line 8—8 of Figure 7.

The method of the present invention involves the use of a spiral surface or surfaces inclosed in a chamber or casing, as is usual and as shown by way of example in Figures 7 and 8. The spiral surface has a plurality of convolutions about an axis and which may rotate around the said axis. The material to be conveyed and distributed is introduced either at the center of the spiral or at the outer end thereof, according to the direction of the rotation of the spiral or the direction in which it is desired to convey the material, and the axis of the spiral may be either horizontal or vertical, or substantially so. If the position of the axis of the spiral is horizontal, any liquid or loose solid material, when introduced in the spiral channel, is conveyed along it from inner to outer end, or vice versa, according to the direction of movement of the spiral. In practicing the method, two distinct conditions of velocity of rotation of the spiral are to be considered: First, if the spiral rotates with low velocity, such that the materials conveyed by it are mostly under the influence of gravity, there is an accumulation of such materials near the lowest point of each winding or convolution of the spiral surface; second, if the spiral rotates with a high angular velocity, such that the materials are mainly under the influence of centrifugal force, said materials are distributed along the whole length of the spiral surface in a uniform layer of film continuously pushed toward the outer end of the spiral surface.

In the latter case it is immaterial from the standpoint of the principle of my invention whether the spiral rotates on a horizontal axis or a vertical axis. It is preferable, however, that this axis coincides with the line of gravity, namely, that it passes through the center of gravity of the spiral, taking into consideration the load of material in the treatment. In either case, however, the material introduced in the rotating spiral is pushed and slides along the surface of the spiral in a thin uniform layer of film so that said film of material is both conveyed and distributed in a manner which will best establish a condition of exposure of the material for efficient contact with a treating medium, which, in case of heating, cooling or drying may be either direct or indirect, with a treating medium, as is common in the processes of distillation, fractioning, evaporation, drying, absorption and the like, or as in the reaction processes like fermentation, chlorination, sulphonation and the like. For instance, with respect to direct contact treatment: if the gaseous treating medium is chlorine which, when introduced into the casing of the apparatus and passed through the spiral chanels will chlorinate materials like powdered lime, liquid hydrocarbons and others, which latter, when being introduced into the hollow shaft of the device and conveyed along the rotating spiral channel toward its outer end in the counter current stream of chlorine, are chlorinated to the desired degree before they leave the conveying surface and discharged therefrom. The treating medium and the gases or vapors taken off from or given up by the material being treated are caused to travel in counter current to the material being treated.

The chlorine may be substituted by sulphur dioxide, nitric oxides, carbon dioxide and others, if my device is employed in sulphitation, nitration, carbonation, or otherwise.

In a similar way, the treating medium may be hot or cold air or gases, which, when introduced into the casing and passed in countercurrent as described above, act as drying, heating or cooling medium for the powdered or liquid material introduced into the hollow shaft and conveyed and distributed through the channel in countercurrent towards the casing from where it is discharged.

The spiral surface may be doubled in order to create a closed jacket in which a cooling medium, like water, or a heating medium, like steam, hot liquids or hot gases, are allowed to circulate in order to effect a heat transfer through the conveying bed to or from the treated material conveyed along it. The means of procuring a heating transfer by the circulating of the heating or cooling medium through the jacket may be accomplished by any known or suitable mechanical means.

In practicing the method described, a spiral 10 is employed which consists of a long sheet of metal or any other suitable material, rolled around an axis 11 with the convolutions of the spiral spaced with respect to each other to form a winding channel 12, as shown in Fig. 1, which is termed, for convenience, the "conveying bed". As the broad principle of the present invention is based upon conveying and distributing materials during treatment along a spiral surface, it is, therefore, immaterial to the invention whether the spiral is in the form of a drum, that is, having heads or end plates, or whether it is open or partially open at its ends, as this depends entirely upon the design of the apparatus in which the invention may be employed. For the same reason the form of the spiral bed may be a plain spiral cylindrical surface or its axial cross-section may be circular or corrugated or otherwise shaped or may be in the form of a spirally wound tube.

In Fig. 2 I have shown a spiral channel, as provided for in Fig. 1, in the form of a drum, that is, closed by sides, plates or heads 13. The form of the axial heads 13, as well as the width of the sheet of material 10' which forms the conveying bed, may vary according to the purpose for which the invention is used, and the cross-section of the spiral channel and the number of spiral windings or convolutions may be liberally designed.

In Fig. 3 I have shown a modified form of the spiral drum shown in Fig. 2 and wherein the cross-sectional shape of the drum is barrel-shaped with the side walls $13^a$ curved, as illustrated, and the width of the convolutions of the spiral $10^a$ progressively decreasing radially from the axis $11^a$.

In some forms of the invention it is desired to have the conveying surface formed with a passage throughout its length for the purpose of circulating a heating or cooling medium therethrough. To this end, there is shown in Fig. 4 a spiral drum $10^b$ having the convolutions thereof formed by spaced double walls $a$ and $b$, and in the space $c$ between the walls may be introduced a treating medium to which is subjected the material being conveyed and distributed. This treating medium may be introduced and discharged into the space or passage $c$ at the ends of the spiral respectively, or at any other intermediate point.

For some purposes, the conveying and distributing device may be made more efficient if two, three or more spiral surfaces are employed and to this end there is shown in Fig. 5 a drum $10^c$ formed by rolling upon the axis $11^c$ a plurality of sheets of metal $d$ or other suitable material, while maintaining said sheets in substantially equi-spaced relation. By this construction the treated materials may be conveyed simultaneously as well as continuously along the spiral surfaces of a plurality of conveying beds or channels $12^d$, thus effecting a more efficient distribution of the material, being subjected to a treating medium. Furthermore, the spiral walls of the conveying bed or channels $12^d$ may be of the jacketed type shown in Fig. 4, so that the treating medium may be introduced therein for indirect contact with the conveyed and distributed material.

For still other purposes the spiral conveyor and distributor may assume the form of a spirally wound tube $10^d$, as shown in Fig. 6, having suitable connection with a hollow shaft $11^d$ which forms the rotating axis of the spiral tube, the material to be treated being conveyed through and distributed within the tube.

It will also be understood that the headers or end plates, 13, $13^a$, $13^b$, and $13^c$ may be jacketed, or formed by double spaced walls, to have the treating medium of the process, in which the present invention is employed, circulate therethrough.

The various conveying and distributing means above referred to may be employed in any suitable apparatus. However, for the purposes of illustration one example of an apparatus is shown in Figures 7 and 8 in which the conveying and distributing means may be employed. This apparatus is similar to the one shown in my co-pending application Serial No. 514,291, in which the form of conveyor illustrated in Figures 1, 2, 3 and 5 is illustrated. In Figures 7 and 8 the conveyor of the type illustrated in Figure 4 is shown.

This apparatus consists of a stationary casing 20, preferably cylindrical in form, having stuffing boxes 21 on its ends through which the rotatable hollow shaft 11 of the conveying means is journaled and through which it extends. This shaft 11 may be driven from any suitable source of power by a gear or pulley, or like means 22. Thus, the conveying and distributing means shown in various forms of the invention and mounted on their respective hollow shafts 11, $11^a$, $11^b$, $11^c$ and $11^d$ may be respectively rotatably disposed within the casing. One end of the hollow shaft of the conveyor is connected to a stationary take-off pipe 23 by means of a gland 24. The other end of the hollow shaft of the conveying means is closed by any suitable means, such as a header 25, through which a supply pipe 26 extends and preferably projects for a distance into the end of said shaft $11^b$. This pipe may be of any size or dimension sufficient for carrying the material which is passed therethrough. This material or liquid, to be treated, as the case may be, will pass from the pipe 26 through the openings 15 in the hollow shaft $11^b$ into the center part of the spiral conveyor $10^b$ and is continuously conveyed through the spiral channel $12^b$ thereof towards the outer end $e$ at the channel. At the same time the treating medium may be introduced into the pipe 27 at the upper end of the casing 20 and will fill the casing and pass through the entire length of the channel $12^a$ of the spiral conveyor toward the axis thereof. If the conveyor is rotated at a high speed, the material to be treated will be acted upon by centrifugal force and form a thin uniform layer of film over the surface $12^b$ or spiral channel, whereas if the conveyor is rotated at a slow speed the material to be treated will lodge in the lower portions of each convolution of the spiral surface, and be gradually fed toward its outer end $c$, or vice versa, according to the direction of movement of the spiral. The distillate vapor resulting from the foregoing process will pass off through the openings 15 and into take-off pipe 23, or the pipe 27, according to the direction of operation of spiral. A suitable valved drain discharge take-off 28 is provided, preferably, at the bottom wall of the casing and may be of any size or character for a specific use. The inlet 27 and the take-off 28 may be controlled by suitable valves.

It will be understood of course that, if desired in the treating of any particular material, the material or substance to be treated may be introduced in the casing through an opening, such as 28, to be picked up by the end $e$ of the conveyor, and that the treating medium may be introduced through the pipe 26, while the vapors may be taken off by a pipe 27, or similar provided means, which may be connected to a suction apparatus.

The conveyor $10^b$ is of the type for treating the material by indirect contact and for this purpose has its side walls as well as the walls forming the conveying surface doubled or jacketed in which a treating medium may circulate, as above described. To this end, a pipe 30 extends co-axially into the hollow shaft $11^b$, through one end thereof, and has connection, at 31, with the space $c$ between the double walls $a$ and $b$ adjacent the shaft. The pipe 30 has its outer end coupled to the end of a stationary pipe 32. A pipe 33 is also introduced through the header 25 into the other end of the hollow shaft and has a lead extending to the peripheral edge of the conveyor where it has connection, as at 34, to the space $c$ formed by the jacket or double walls $a$ and $b$. The treating medium may be introduced and taken off by either of the pipes 30 or 33, as may be desired or found convenient, but by this construction the treating medium does not come into direct contact with the material being treated. In this case the material to be treated may be introduced through the pipe 26 and fed toward the opening $e$ thereof into the casing 20 and picked up by the end $e$ of the spiral surface and conveyed to the hollow shaft $11^b$ through the openings 15 thereof, and then taken off from the hollow shaft in any convenient manner well known in the art. As above stated, while the form of conveyor shown in Figure 4 has been shown in connection with Figures 7 and 8, any one of the conveyors shown in Figures 1 to 6 inclusive, may be employed.

In operation, the devices, shown in the several views of the drawings are rotated and the material to be treated is fed thereinto continuously or in successive increments either through the hollow shafts 11, 11', $11^a$, $11^b$, $11^c$ or $11^d$, which have openings 15 therein communicating with the inner ends of the spiral conveying beds, or at the outer ends of said beds, according to the direction of rotation of the devices.

I am aware that spiral surfaces have been previously proposed for conveying materials during treatment, but my invention differs from these in that it is particularly used for conveying and distributing such materials, which during the whole travel along the spiral surfaces are distributed into small fractions in each convulsion of the spiral, if the rotation is slow, or into a thin layer or film due to centrifugal force, if the rotation is fast,—and which, due to such distribution, not only most adaptable for treatment by direct contact for vapor or gases flowing in the channel or by indirect contact by means of heat transfer from or to the heating medium on the jacketed wall of the spiral channel, but— that are distributed in a serial succession of small portions from initial stage to the final stage of involved reaction, thus making possible a continuity of treatment in a small apparatus. My invention has for its purpose to perform a continuous process by progressive change of treated materials from the stage of their initial properties to the stage of their intended properties by means of the directed distribution during the treatment instead of a mere forcing, pumping or conveying of materials.

What is claimed as new is:

1. A method of treating materials, which method includes conveying and distributing said material during the treatment in a thin layer of a spiral conveying channel, gradually changing the properties of said material from the initial stage of the treatment to those of the final stage of the treatment by subjecting said distributed and conveyed materials to a heating exchange with a heating or cooling medium by indirect contact through the walls of said surface.

2. A method of conveying materials during treatment by continuously distributing the materials along a spiral conveying surface by rotating said surface in such a manner as to distribute the material thereover in a thin layer or film, and subjecting said distributed material, while being so conveyed, to direct contact with a treating gaseous or vaporous medium moving in a direction opposite that of the treated material, taking substantially all of the resultant vapors off at one end of the spiral and the residue of the treated material at the other end thereof.

3. In a method of treating materials capable of distribution over a surface by flow with a vapor or gaseous treating medium, said method including conveying said material during the treatment and distributing it in a thin layer along a spiral path, progressively changing the properties of said material by infinitesmal steps from the initial stage of the treatment to those of the final stage of the treatment by subjecting said conveyed and distributed materials to a gas or vaporous treating medium, and causing substantially all gases and vapors to traverse said channel in a counter direction to the movement of the material therein.

4. A method of treating the materials including distributing the material during treatment along a closed spiral conveying channel by rotating such spiral, gradually changing the properties of said treated material progressively by infinitesmal steps from their initial stage to their final stage of treatment by subjecting said material to a treating medium moving wholly through the spiral between the points of initial and final stages of treatment and in counter direction to that of said treated material.

5. In a device for conveying and distributing material subject to a process treatment, said device including a spiral conveying bed rotatably mounted about its axis, and having the walls thereof jacketed, and means to admit and discharge a heating medium to and from said jacket.

6. In a device for conveying and distributing material subject to a process treatment, a spiral conveying bed rotatably mounted about its axis, the walls of said conveying bed having passages therein through which a treating medium may pass in heat exchange relation with the conveying bed.

7. In an apparatus of the type described, a rotary drum having a spiral surface therein with its convolutions spaced to form a closed spiral channel, means for admitting material to be treated into the drum at one end portion so as to contact therewith and be conveyed by said surface therealong in layers or films not obstructing said channel when the drum is rotated, whereby gases and vapors may be permitted to pass between the convolutions of said surface, means for subjecting the material in said channel to a treating medium, and means for taking off gases and vapors from said channel in a counter current direction to the movement of the conveyed material being treated.

8. In an apparatus of the type described, a rotary drum having a spiral surface thereon with its convolutions spaced to form a closed spiral channel opened only at its end portions, means for admitting material to be treated into one end portion of said drum so as to be conveyed by said surface therealong in layers or films not obstructing said channel when the drum is rotated, whereby the residue from the treatment may be discharged at the other end of the channel and the gases and vapors may be permitted to pass between the convolutions of said surface, means whereby the treating medium may be introduced into said spiral channel at the material discharge end thereof, and means for taking off the gases and vapors from said channel at or near the material intake end of the channel, whereby the treating medium and any other gases or vapors are caused to move in said channel in a counter current direction to the movement of the material being treated.

ADOLPH PLACEK.